United States Patent [19]

Criswell et al.

[11] Patent Number: 4,862,549
[45] Date of Patent: Sep. 5, 1989

[54] PIPE PREPARATION DEVICE FOR SOLDERING OR BRAZING

[76] Inventors: Gerald W. Criswell, R.D. #Box 135-A, Reedsville, Pa. 17084; Gerald W. Criswell, II, R.D. No. 1, Box 120, Milroy, Pa. 17063

[21] Appl. No.: 229,022

[22] Filed: Aug. 5, 1988

[51] Int. Cl.⁴ ............................................. B08B 9/02
[52] U.S. Cl. .............................. 15/104.04; 15/104.05; 15/104.1 R; 15/106; 15/160
[58] Field of Search ........... 15/104.03, 104.04, 104.05, 15/104.1 R, 106, 160, 164

[56] References Cited

U.S. PATENT DOCUMENTS

| | | | |
|---|---|---|---|
| 622,446 | 4/1899 | Clute | 15/164 |
| 937,019 | 10/1909 | Bethsold | 15/164 |
| 1,176,497 | 3/1916 | Sumner | 15/164 |
| 2,124,748 | 7/1938 | Ransom, Jr. | 15/164 |
| 2,303,824 | 12/1942 | Comins | 15/104.04 X |
| 2,629,121 | 2/1953 | Petre | 15/104.03 |
| 3,188,674 | 6/1965 | Hobbs | 15/179 |
| 3,266,075 | 8/1966 | Conrad | 15/164 X |

FOREIGN PATENT DOCUMENTS

| | | | |
|---|---|---|---|
| 0664099 | 2/1988 | Switzerland | 15/104.04 |
| 2147835 | 5/1985 | United Kingdom | 15/104.03 |

*Primary Examiner*—Edward L. Roberts
*Attorney, Agent, or Firm*—Robert F. Palermo

[57] ABSTRACT

A device for cleaning pipe or tubing and fittings is disclosed consisting of an internal brush for cleaning of fittings and an external brush for cleaning of tube or pipe prior to soldering or brazing. Both brushes are provided in a single tool so that either tube or fitting can be cleaned without changing or reversing the tool. A drive socket is provided on the brush holder shell to permit ready interchangeability of tools and ready selection of drive means between manual and motor driven operation. A selection of drive adaptors is provided.

15 Claims, 1 Drawing Sheet

U.S. Patent  Sep. 5, 1989  4,862,549
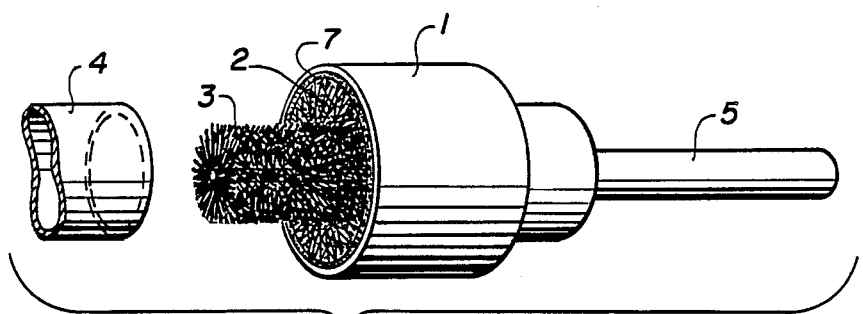
Fig. 1
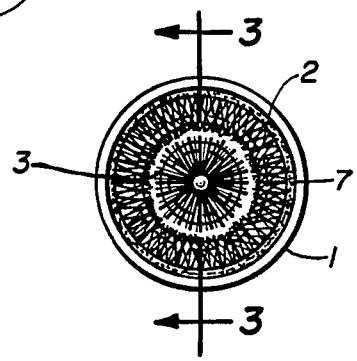
Fig. 2
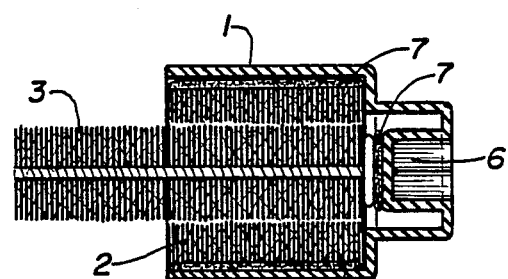
Fig. 3
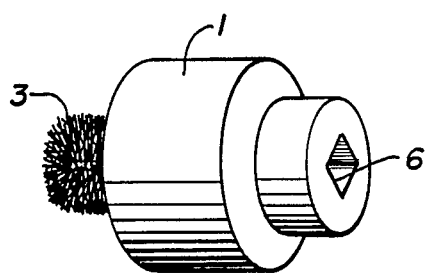
Fig. 4
Fig. 5
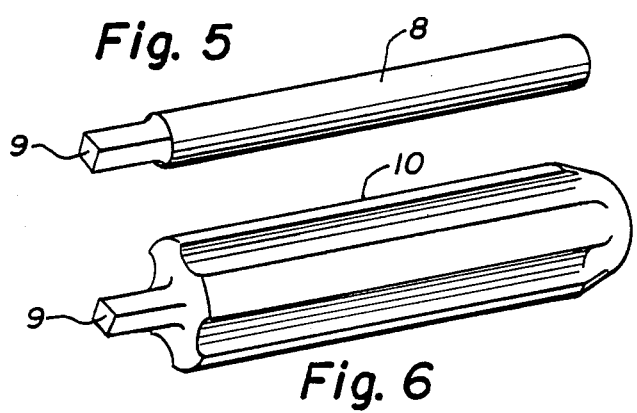
Fig. 6
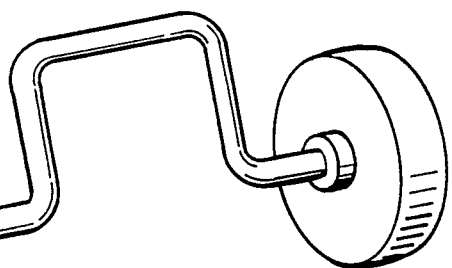
Fig. 7

PIPE PREPARATION DEVICE FOR SOLDERING OR BRAZING

This invention relates to an improved means for cleaning pipe or tubing and fittings for soldering or brazing. More particularly, it relates to a device for abrading copper or brass tubing and fittings, using wire brushes, to remove oxides and contaminants preparatory to soldering or brazing.

BACKGROUND OF THE INVENTION

Soldering or brazing of pipe or tubing requires that the mating (or faying) surfaces of the pipe and fittings be thoroughly cleaned to present oxide-free and contaminant free surfaces which can be wetted by the molten solder or brazing alloy. This is required to form sound joints which are free of porosity and voids and which do not leak.

This is normally accomplished by degreasing the joint components, if necessary, and then abrading the faying surfaces. Degreasing is accomplished by wiping with a solvent appropriate for the oily contaminant to be removed. Oxides and dry contaminants are manually removed by rubbing with dry steel wool, emery cloth, or wire brushes. They may also be removed by using motor driven brushes or emery cloth.

Proper cleaning of joint members prior to soldering or brazing is essential in order to economically form sound joints. Clean joint surfaces can be rapidly soldered or brazed using a minimum of heat, flux, and filler alloy. These economies of time, energy, and materials more than offset the cost of proper cleaning.

Manual cleaning of a large number of tube/fitting joint components can become tedious and time consuming and can, thus, lead to operator inattention and error. Clearly, motor driven abrasion means can eliminate tedium and permit rapid and effective cleaning of large numbers of joint components.

One such motor driven device has been disclosed in U.S. Pat. No. 3,188,674 by R. L. Hobbs in June 1965. This consists of a drill mounted brush holder for cleaning the outer surface of tube ends prior to soldering or brazing. It also includes provision for adjustment of the replaceable brush to account for wear. It provides the advantages of being motor driven, having replaceable brushes, and having adjustment capability for the brush.

This device cannot be used for cleaning the inside surfaces of fittings, and it may only clean part of the tube edge. Its design requires a different unit for each size of tube to be cleaned. This is not a disadvantage in a manufacturing plant where a great number of assemblies are made using a single tube diameter. It may, however, be inconvenient to a household plumber who may have to install several different sizes of tubing and fittings.

It is an object of this invention to provide a means for cleaning the ends of pipe or tubing and fittings prior to soldering or brazing. It is a further object to provide said means in such a manner as to permit cleaning of two or more sizes of tubing and fittings using a single tool. It is a still further object to provide said cleaning means with a device which is operable by manual or motor driven means.

DESCRIPTION OF THE INVENTION

The operation of this invention will be readily understood by reference to the specification and the accompanying drawings, in which:

FIG. 1 is an overall view showing the invention configured for motor driven use.

FIG. 2 is a frontal elevation view showing the inner and outer brushes.

FIG. 3 is an axial sectional view, along line 3—3 of FIG. 2, showing the inner and outer brushes, their attachment, and the drive socket.

FIG. 4 is a rear quarter perspective view showing the drive socket in more detail.

FIGS. 5, 6, and 7 show drive adaptors for drill or other motor drives, manual hand drive, and manual speed-wrench drive, respectively.

Referring to FIG. 1, the invention can be seen, in the motor driven configuration, to consist of a hollow cylindrical shell 1 having one closed end, an outer wire brush 2, an inner wire brush 3 which extends slightly forward of the open end of shell 1, and a drive adaptor 5 for mounting in a motor driven chuck or collet.

In use, the invention is mounted to a motor drive by adaptor 5 and rotated. The tube or fitting 4 to be cleaned is forced over inner brush 3 and into outer brush 4 for a sufficient distance to clean the faying surface of the tube or fitting 4 for soldering or brazing.

For cleaning fittings 4, whose faying surfaces are normally on the inside of the fitting, the inner brush 3 is inserted only far enough to clean the faying surface or joint face. This results in complete cleaning of the inside fitting joint faying surface, the edge of the fitting, and a small portion of the outside of the fitting.

For cleaning tube, the opposite is true. The external faying surface of the tube is cleaned by inserting the tube 4 a sufficient distance into the outer brush 2. This cleans the outside tube joint faying surface, the tube edge, and a portion of the internal tube surface.

Although it is usually unnecessary to clean the outside of the fitting or the inside of the tube, this unnecessary cleaning is tolerated for the convenience of using a single tool to clean both joint members.

Referring to FIGS. 2, 3, and 4, the invention is seen in greater detail. FIG. 2 shows the shell 1, the outer brush 2, and the inner brush 3 in frontal elevation. FIG. 3 shows an axial section along line 3—3 of FIG. 2. Here is seen the shell 1, outer brush 2, inner brush 3, drive socket 6, and brush attachment layer 7. The rear quarter view of FIG. 4 shows the shell 1, the projecting inner brush 3, and drive socket 6.

In FIGS. 2 and 3, the wire bristles of outer brush 2 and inner brush 3 are shown virtually touching. This is necessary because the I.D. of a fitting 4, cleaned by inner brush 3, is slightly larger than the O.D. of the tube 4, cleaned by outer brush 2. Because of this design feature, the wire bristles are the maximum length possible for each size of brush. This provides the flexibility necessary to allow use of the brush to clean more than one size of tube and fitting—for example one-half (½) inch and three-quarter (¾) inch diameter. In cleaning the smaller size fitting, the bristles of inner brush 3 flex sufficiently to enter the fitting and spring back when removed. The converse is true of outer brush 2 when used to clean the larger size tube. Because of this elastic springback, the bristles undergo virtually no permanent deformation, and the brush diameters remain essentially constant except for wear, which eventually reduces bristle length. This elasticity is achieved by using hard drawn stainless steel or carbon steel wire for the bristles. The resultant high yield strength of the bristles coupled with their maximum length permits a high degree of elastic deformation from which the bristles readily recover.

Inner brush 3 is constructed of wire bristles held by two or more heavy central wires twisted into a tight helix. This is the same construction as is used for commonly available bottle brushes. The heavy helical wires are inserted in the shell 1 at the bottom of socket 6 and adhesively secured. In metal construction, the inner brush 3 may be attached by adhesive bonding, soldering, brazing, or mechanical means. Outer brush 2 is constructed of wire bristles embedded in a polymeric sleeve, much as a common toothbrush is constructed, or inserted through perforations in a thin metal strip, which is then formed into a sleeve of appropriate diameter and installed in shell 1. The polymeric or metal sleeve is attached to the shell by high strength adhesive bonding or by mechanical means.

Although soldering or brazing can be used for attaching the metal outer brush 2 to shell 1, it is preferred to use adhesive bonding or mechanical means for this purpose in order to avoid temperatures which may soften the wire bristles.

The shell 1 is best understood by reference to FIGS. 3 and 4. The cross sectional view in FIG. 3 shows the shell 1 as contemplated, in its preferred form, as a one piece deep drawn sheet metal cup. It could equally well be made as a one piece molded polymeric structure with the bristles of outer brush 2 molded in place in the shell. The choice of manufacturing method will be determined by manufacturability, economics of demand, tool amortization, and unit labor cost.

Inner brush 3 and outer brush 2 are preferably attached to the shell 1 by an adhesive bond layer 7 which may be any commercially available high strength adhesive.

Drive socket 6 is a standard square drive socket for one-half (½) inch or three-eighths (⅜) inch drive. The three-eights (3/8) inch drive size would be adequate; because there is not a high torque requirement. For convenience, it could be used with a one-half (½) inch to three-eighths (⅜) inch reducer when being driven with a manual one-half (½) inch drive wrench set.

Referring to FIGS. 5, 6, and 7, the electric motor drive adaptor 8, manual hand drive adaptor 10, and manual speed wrench drive adaptor 11 are shown. The square drive 9 of each is made to engage with drive socket 6 to rotate the brushes.

The advantage provided by this square drive feature is that the brushes can be quickly interchanged to clean tubes and fittings of different sizes. Although a single brush can be used to clean more than one size of tube or fitting, if there are work pieces of several different sizes to be cleaned, this easy interchangeablity provides a significant advantage. In this way, any one of the many sizes of brush assemblies can be used as needed by merely placing it on the drive adaptor.

I have described my invention and its operation in its preferred embodiment so as to enable anyone skilled in the art to make and use it. It is clear that various modifications can be made in materials and structure without departing from the spirit of my invention, as described.

Having thus described my invention, I claim the following:

1. A device for abrading tube and fittings preparatory to soldering or brazing which consists of a cuplike shell having a square drive socket on its closed end; an outer brush of hard, drawn wire attached to a sleeve which is bonded to the shell; an inner brush also of hard drawn wire which is attached to the inside of the closed end of the shell and which extends a distance forward of the open end of the shell, which distance is proportional to the diameter of tube and fitting for which it is intended; a drive adaptor for use in the chuck or collet of a drill or other motor drive; and a manual hand drive adaptor.

2. A device for abrading tube and fittings, as in claim 1, in which the wire bristles are made from hard drawn stainless steel wire.

3. A device for abrading tube and fittings, as in claim 1, in which the wire bristles are made from hard drawn carbon steel wire.

4. A device for abrading tube and fittings, as in claim 1, in which the inner brush is attached to the inside of the shell by soldering.

5. A device for abrading tube and fittings, as in claim 1, in which the inner brush is attached to the inside of the shell by brazing.

6. A device for abrading tube and fittings, as in claim 1, in which the inner brush is attached to the inside of the shell by adhesive bonding.

7. A device for abrading tube and fittings, as in claim 1, in which the inner brush is attached to the inside of the shell by mechanical means.

8. A device for abrading tube and fittings, as in claim 1, in which the outer brush sleeve is formed of thin perforated steel through which the bristles are inserted.

9. A device for abrading tube and fittings, as in claim 1, in which the outer brush sleeve is made of a polymeric molding compound in which the bristles are embedded.

10. A device for abrading tube and fittings, as in claim 1, in which the outer brush sleeve is attached to the shell by soldering.

11. A device for abrading tube and fittings, as in claim 1, in which the outer brush sleeve is attached to the shell by brazing.

12. A device for abrading tube and fittings, as in claim 1, in which the outer brush sleeve is attached to the shell by high strength adhesive bonding.

13. A device for abrading tube and fittings, as in claim 1, in which the outer sleeve is attached to the shell by mechanical means.

14. A device for abrading tube and fittings, as in claim 1, in which the cuplike outer shell with its drive socket is made of deep drawn steel.

15. A device for abrading tube and fittings, as in claim 1, in which the cuplike outer shell with its drive socket is made of a polymeric molding compound.

* * * * *